(12) United States Patent
Lim

(10) Patent No.: US 9,086,800 B2
(45) Date of Patent: Jul. 21, 2015

(54) APPARATUS AND METHOD FOR CONTROLLING SCREEN DISPLAYS IN TOUCH SCREEN TERMINAL

(75) Inventor: Byoung-Hui Lim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 103 days.

(21) Appl. No.: 13/329,067

(22) Filed: Dec. 16, 2011

(65) Prior Publication Data

US 2012/0194559 A1 Aug. 2, 2012

(30) Foreign Application Priority Data

Jan. 28, 2011 (KR) ........................ 10-2011-0008893

(51) Int. Cl.
*G09G 5/00* (2006.01)
*G06F 3/0488* (2013.01)
(52) U.S. Cl.
CPC .. *G06F 3/04883* (2013.01); *G06F 2203/04806* (2013.01)

(58) Field of Classification Search
CPC ............. G09G 2340/0407; G09G 2340/0414; G06T 3/40; G06F 3/0481; G06F 2203/04806
See application file for complete search history.

(56) References Cited

U.S. PATENT DOCUMENTS

| 8,339,480 | B2 * | 12/2012 | Lee et al. ................. 348/240.99 |
| 2004/0027395 | A1 * | 2/2004 | Lection et al. ................ 345/855 |
| 2009/0061948 | A1 * | 3/2009 | Lee et al. ...................... 455/566 |
| 2009/0102920 | A1 * | 4/2009 | Yamanaka .................... 348/143 |
| 2010/0229130 | A1 * | 9/2010 | Edge et al. .................... 715/863 |
| 2011/0019058 | A1 * | 1/2011 | Sakai et al. ............. 348/333.01 |
| 2011/0134061 | A1 * | 6/2011 | Lim .............................. 345/173 |
| 2011/0231796 | A1 * | 9/2011 | Vigil ............................. 715/810 |

FOREIGN PATENT DOCUMENTS

KR 10-2009-0102727 9/2009
KR 10-2009-0111399 10/2009

* cited by examiner

*Primary Examiner* — James A Thompson

(57) ABSTRACT

A method and apparatus for controlling screen display in a touch screen terminal. The method includes determining a zoom-in region, zooming in contents belonging to the zoom-in region at a corresponding magnification, and expressing the zoomed-in contents.

9 Claims, 5 Drawing Sheets

APPARATUS AND METHOD FOR
CONTROLLING SCREEN DISPLAYS IN
TOUCH SCREEN TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 28, 2011 and assigned Serial No. 10-2011-0008893, the contents of which are herein incorporated by reference.

TECHNICAL FIELD

The present disclosure relates to a method and apparatus for controlling a screen display in a touch screen terminal. More particularly, the present disclosure relates to a display method and apparatus for zooming in a screen by a user's touch.

BACKGROUND

Today, owing to the development of electronic communication industries, portable terminals such as mobile communication terminals, electronic pocketbooks, Personal Digital Assistants (PDAs), and the like, are becoming necessities of modern society while becoming significant means for delivery of information that changes quickly.

As widely known, recent portable terminals apply a touch screen in which a screen touch induces an input. The touch screen is a screen equipped with an input device for, if there is a hand touch, receiving an input of its position. The touch screen satisfies users with its convenience. That is if a user hand touches character or picture information previously appearing on the touch screen, the portable terminal detects what item is selected by the user according to a touched position of the screen, and processes a command corresponding to the touch.

A portable terminal (hereinafter, referred to as a 'touch screen terminal') equipped with this touch screen provides a function of zooming in a screen. For one example, a user can zoom in a screen using a multi touch scheme. The multi touch scheme zooms in or out the screen depending on a change of a distance between points touched by user's two fingers. That is, if the user widens a space between the two fingers to increase a distance between two touch points, the screen is zoomed in and, if the user narrows the space between the two fingers to decrease the distance between the two touch points, the screen is zoomed out. Accordingly, to zoom in or out the screen up to a desired level, the user may have to repeat the aforementioned operation a number of times.

SUMMARY

To address the above-discussed deficiencies of the prior art, it is a primary object to provide at least the advantages below. Accordingly, one aspect of the present disclosure is to provide a method and apparatus for designating a region in which contents are expressed, for the purpose of zoom in dependent on a touch and move in a touch screen terminal.

Another aspect of the present disclosure is to provide a method and apparatus for designating a region and zooming in contents expressed in the designated region to a full screen in a touch screen terminal.

The above aspects are achieved by providing a method and apparatus for controlling screen display in a touch screen terminal.

According to one aspect of the present disclosure, a method for controlling a screen display in a touch screen terminal is provided. The method includes determining a zoom-in region, and zooming in and expressing contents belonging to the zoom-in region at a corresponding magnification.

According to another aspect of the present disclosure, an apparatus for controlling a screen display in a touch screen terminal is provided. The apparatus includes a touch screen unit configured for input and output. The apparatus also includes a storage unit configured to store data. The apparatus further includes a controller configured to control a general operation of the apparatus. The controller determines a zoom-in region, zooms in contents belonging to the zoom-in region at a corresponding magnification, and expresses the zoomed-in contents.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification.

Exemplary embodiments of the present disclosure provide a method and apparatus for controlling a screen display in a touch screen terminal. Particularly, the exemplary embodiments of the present disclosure provide a method and apparatus for designating a region according to a touch and move, and zooming in contents expressed in the designated region to a full screen in a touch screen terminal.

Figure 1:
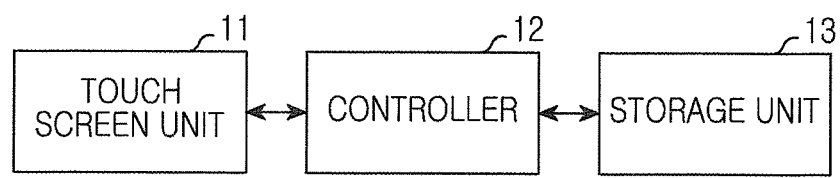
FIG. 1 is a block diagram illustrating a construction of a touch screen terminal according to an embodiment of the present disclosure.

FIG. 1 is a block diagram illustrating a construction of a touch screen terminal according to an embodiment of the present disclosure.

Referring to FIG. 1, the touch screen terminal according to the present disclosure includes a touch screen unit 11 for input and output, a controller 12 for performing the control of general operation, and a storage unit 13 for storing data.

The touch screen unit 11 outputs an input signal dependent on a touch to the controller 12, and receives an input of display data corresponding to the input signal to display the display data under the control of the controller 12.

The storage unit 13 stores a predetermined program for controlling the general operation of the touch screen terminal and various data input/output when a control operation of the touch screen terminal is performed.

The controller 12 controls the general operation of the touch screen terminal. Below, a method for zooming a screen in or out is described in detail with reference to the accompanying drawings.

Figure 2:
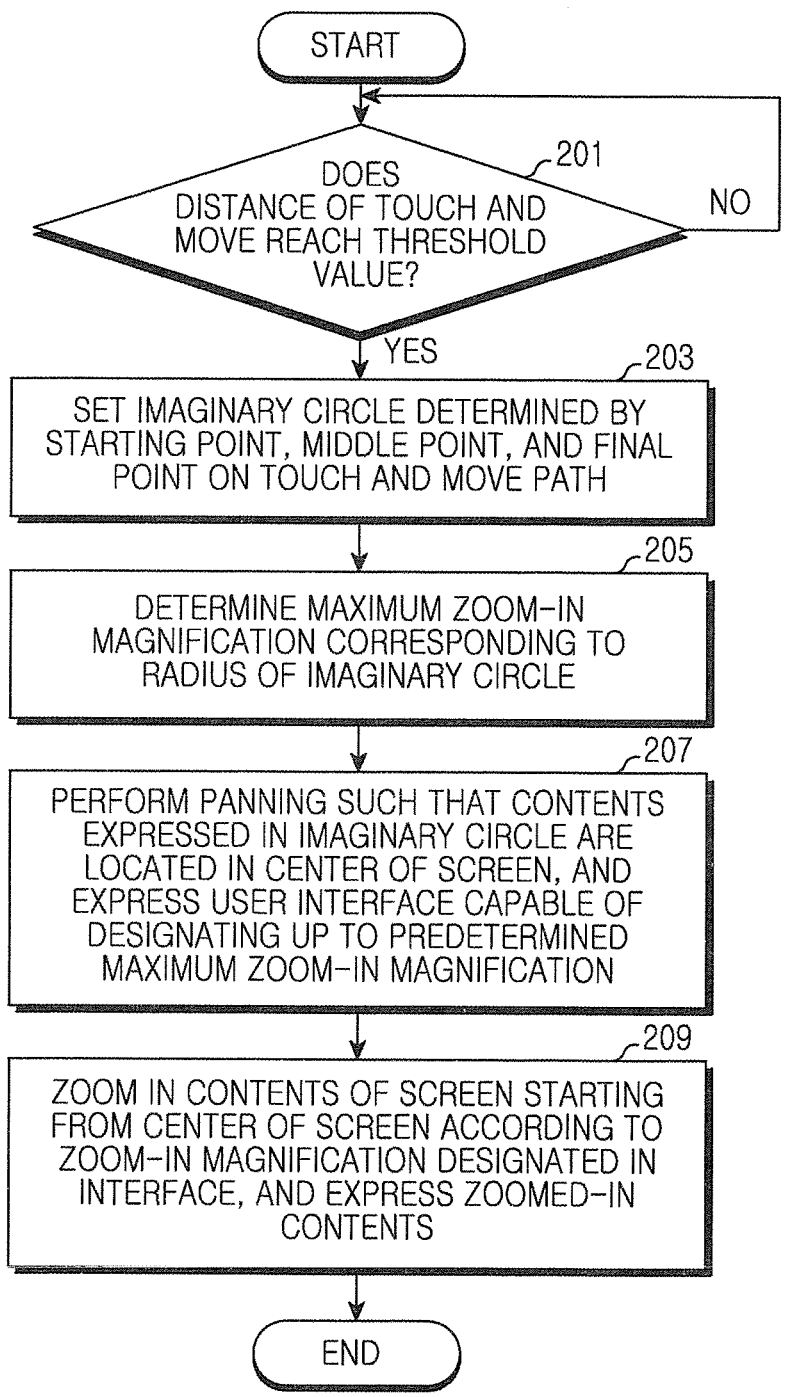
FIG. 2 is a flowchart illustrating a screen zoom-in procedure in a touch screen terminal according to an embodiment of the present disclosure.

FIG. 2 is a flowchart illustrating a screen zoom-in procedure in a touch screen terminal according to an embodiment of the present disclosure.

In the following description, it is assumed that a screen zoom-in mode according to an embodiment of the present disclosure is in operation. The zoom-in mode can be activated through a predefined key or can be operated automatically when reading a Web page, an image and the like.

Referring to FIG. 2, the controller 12 determines if a distance of a touch and move reaches a threshold value (block 201).

If it is determined in block 201 that the distance of the touch and move reaches the threshold value, the controller 12 sets an imaginary circle determined by three points—a starting point, a middle point, and a final point—on a path of the touch and move (block 203). The starting point is a point which a touch starts from, the final point is a point reaching a threshold distance, and the middle point is a center point of the touch and move path having the threshold distance.

After that, the controller 12 determines a maximum zoom-in magnification corresponding to a radius of the imaginary circle (block 205). For one example, the maximum zoom-in magnification can be a magnification capable of zooming in the imaginary circle to a full screen. That is, the more the radius of the imaginary circle is, the less the maximum zoom-in magnification is. As described later, contents expressed in the imaginary circle can be zoomed in and expressed to a full screen according to an embodiment of the present disclosure.

Also, as described later, the imaginary circle defines a region in which contents intended for zoom in are expressed.

Next, the controller 12 performs panning such that the contents expressed in the imaginary circle are located in the center of the screen, and expresses a user interface capable of designating up to a predetermined maximum zoom-in magnification (block 207). That is, a user can designate any one of a 1× magnification to the determined maximum zoom-in magnification in the expressed interface. Particularly, an interface according to an embodiment of the present disclosure can allow a user to designate a zoom-in magnification higher as touching, moving and rotating in a clockwise direction.

After that, the controller 12 zooms in the contents of the screen starting from the center of the screen according to the zoom-in magnification designated in the interface and expresses the zoomed-in contents (block 209). For one instance, if the user releases after touching and moving in a clockwise direction in the interface, a corresponding magnification is designated.

Figure 3:
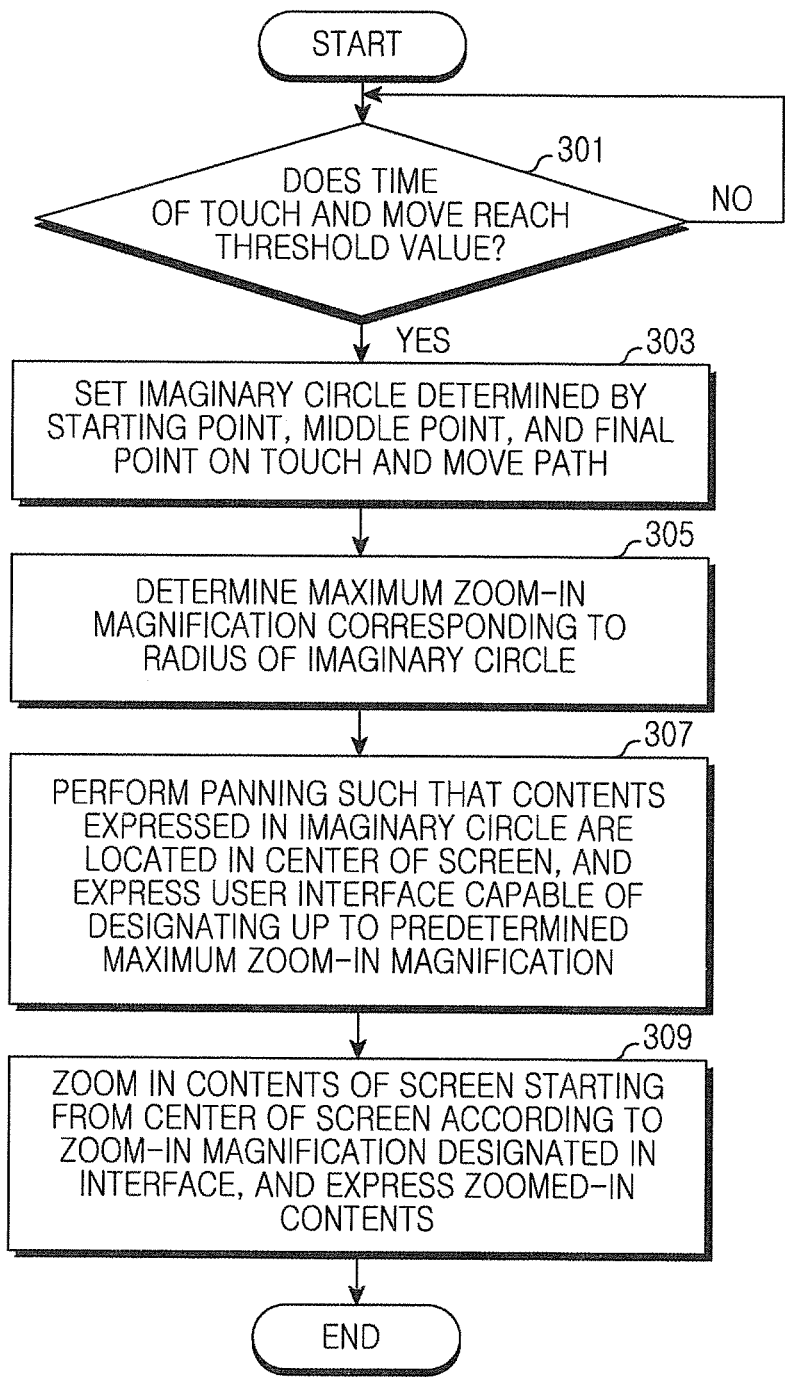
FIG. 3 is a flowchart illustrating a screen zoom-in procedure in a touch screen terminal according to another embodiment of the present disclosure.

FIG. 3 is a flowchart illustrating a screen zoom-in procedure in a touch screen terminal according to an embodiment of the present disclosure.

Referring to FIG. 3, the controller 12 identifies if a time of a touch and move reaches a threshold value (block 301).

If it is identified in block 301 that the time of the touch and move reaches the threshold value, the controller 12 sets an imaginary circle determined by three points—a starting point, a middle point, and a final point—on a path of the touch and move (block 303). The starting point is a point which a touch starts from, the final point is a point reaching a threshold distance, and the middle point is a center point of the touch and move path having the threshold distance.

After that, the controller 12 determines a maximum zoom-in magnification corresponding to a radius of the imaginary circle (block 305). For one example, the maximum zoom-in magnification can be a magnification capable of zooming in the imaginary circle to a full screen. That is, the more the radius of the imaginary circle is, the less the maximum zoom-in magnification is. As described later, contents expressed in the imaginary circle can be zoomed in to a full screen and expressed according to an embodiment of the present disclosure.

Next, the controller 12 performs panning such that the contents expressed in the imaginary circle are located in the center of the screen, and expresses a user interface capable of designating up to a predetermined maximum zoom-in magnification (block 307). That is, a user can designate any one of a 1× magnification to the determined maximum zoom-in magnification in the expressed interface. Particularly, an interface according to an embodiment of the present disclosure can allow the user to designate a zoom-in magnification higher as touching, moving and rotating in a clockwise direction.

After that, the controller 12 zooms in the contents of the screen starting from the center of the screen according to the zoom-in magnification designated in the interface and expresses the zoomed-in contents (block 309). For one instance, if the user releases after touching and moving in a clockwise direction in the interface, a corresponding magnification is designated.

Figure 4A:
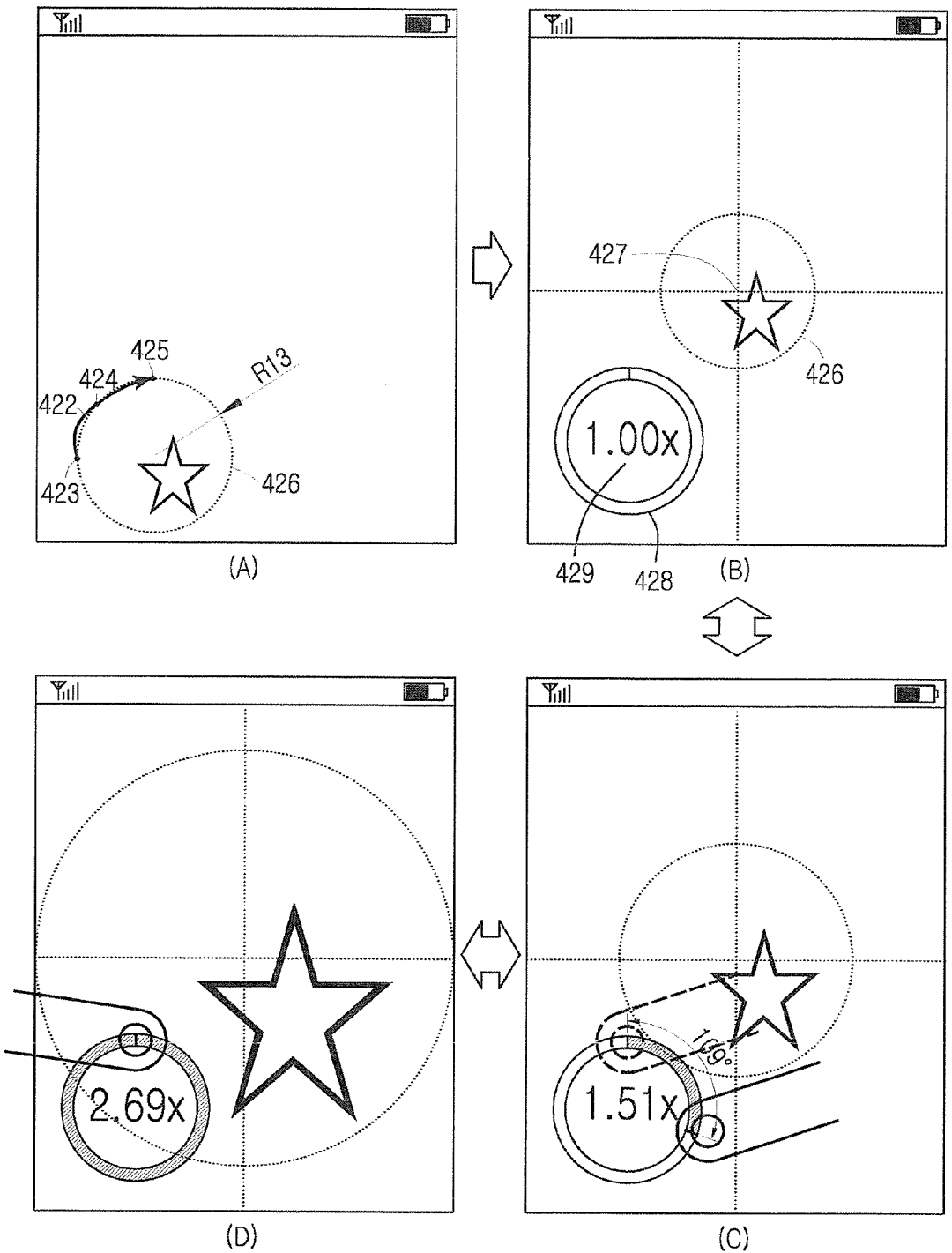
FIGS. 4A and 4B are diagrams illustrating a process of zooming in a screen in a touch screen terminal according to an embodiment of the present disclosure.
Figure 4B:
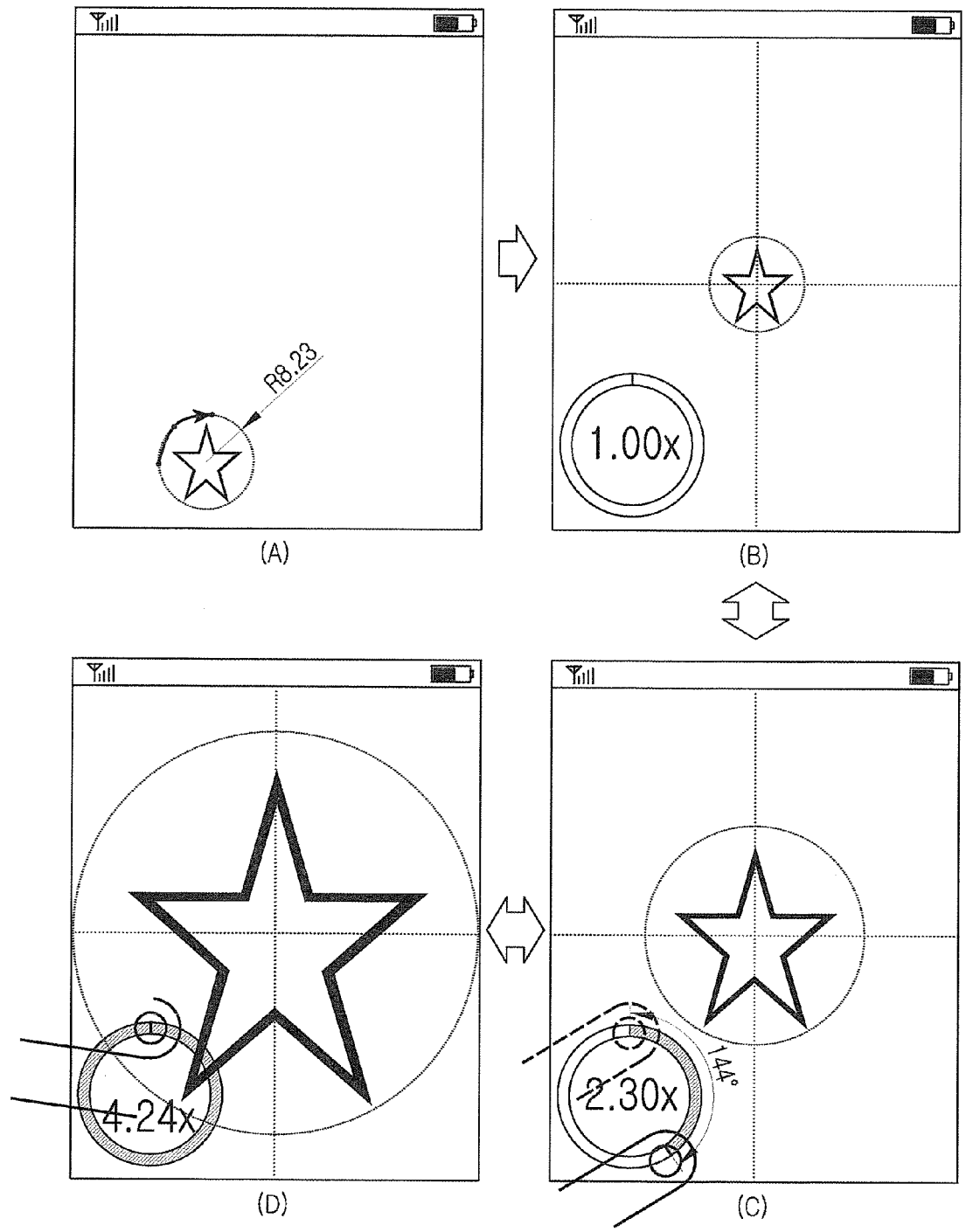

FIGS. 4A and 4B are diagrams illustrating a process of zooming in a screen in a touch screen terminal according to an embodiment of the present disclosure.

Referring to FIG. 4A, the terminal executes a zoom-in mode according to an embodiment of the present disclosure. If a user touches and moves, when a distance or time of the touch and move reaches a threshold value, the terminal sets an imaginary circle 426 determined by a starting point 423, a middle point 424, and a final point 425 on a path 422 of the touch and move (as shown in part (A)). The terminal determines a maximum zoom-in magnification corresponding to a radius of the imaginary circle 426. The maximum zoom-in magnification can be a magnification capable of zooming in the imaginary circle 426 to a full screen. That is, the greater the radius of the imaginary circle is, the less the maximum zoom-in magnification is.

Next, the terminal performs panning such that contents expressed in the imaginary circle are located in the center of the screen, and provides a user interface capable of designating up to a predetermined maximum zoom-in magnification (as shown in part (B)). An interface according to an embodiment of the present disclosure can be of a form of being able to designate a zoom-in magnification higher as touching, moving, and rotating in a clockwise direction. The interface informs a magnification dependent on a user's touch and move, and designates a corresponding magnification of timing at which the touch and move is released.

It can be dynamically identified that, as a touch and move proceeds in a clockwise direction in the interface, the terminal zooms in the contents of a screen starting from the center of the screen (part (C)). If a user touches and moves by 360° in the clockwise direction in the interface, the terminal can designate a predetermined maximum zoom-in magnification (e.g., 2.69) corresponding to the radius of the imaginary circle (part (D)). Also, after the user touches and moves in the clockwise direction in the interface and zooms in a corresponding object, if the user touches and moves in a counter-clockwise direction, the terminal can again zoom out the corresponding object. That is, as a rotation angle dependent on a touch and move increases, the terminal reaches a maximum zoom-in magnification. In a comparison of FIGS. 4A and 4B, it can be seen that, the greater the radius of the imaginary circle is, the less the determined maximum zoom-in magnification is.

In conclusion, a method and apparatus for controlling screen display in a touch screen terminal according to the present disclosure have no need to repeat an operation of touching and un-touching by a finger in order to zoom in or out a screen up to a desired level, thus ease of use is made prominent.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method for displaying contents in an electronic device including a touch screen, the method comprising:
   responsive to detecting a first touch and drag on the touch screen, identifying an imaginary circle based on a circumference comprising a starting point, a middle point and a final point on a path of the first touch and drag;
   detecting a region inside the identified imaginary circle to be zoomed, the region in which contents intended for zoom in are displayed;
   responsive to detecting the detected region to be zoomed, panning the contents displayed in the detected region to a center of the touch screen;
   displaying a circle capable of designating up to maximum zoom-in magnification, wherein the maximum zoom-in magnification is set based on a size of the imaginary circle;
   responsive to a second touch and drag following a circumference of the displayed circle, determining zoom-in magnification wherein the zoom-in magnification is proportional to a rotation angle associated with a final point of the second touch and drag;
   displaying the determined zoom-in magnification inside the displayed circle; and
   zooming in the contents included in the detected region according to the determined zoom-in magnification via the circle.

2. The method of claim 1, wherein identifying the imaginary circle based on the circumference comprising the starting point, the middle point and the final point on the path of the first touch and drag comprises:
   when a distance or time of the first touch and drag reaches a threshold value, identifying the imaginary circle based on the circumference comprising the starting point, the middle point, and the final point on the path of the first touch and drag.

3. The method of claim 1, wherein the maximum zoom-in magnification is set as a zoom-in magnification capable of zooming in the imaginary circle to a full screen.

4. An electronic device, comprising:
   a touch screen; and
   a controller configured to:
       responsive to detecting a first touch and drag on the touch screen, identify an imaginary circle based on a circumference comprising a starting point, a middle point and a final point on a path of the first touch and drag;
       detect a region inside the identified imaginary circle to be zoomed, the region in which contents intended for zoom in are displayed;
       responsive to detecting the detected region to be zoomed, pan the contents displayed in the detected region to a center of the touch screen;
       display a circle capable of designating up to maximum zoom-in magnification, wherein the maximum zoom-in magnification is set based on a size of the imaginary circle;
       responsive to a second touch and drag following a circumference of the displayed circle, determine zoom-in magnification wherein the zoom-in magnification is proportional to a rotation angle associated with a final point of the second touch and drag;
       display the determined zoom-in magnification inside the displayed circle; and
       zoom in the contents included in the detected region according to the determined zoom-in magnification via the circle.

5. The electronic device of claim 4, wherein, when a distance or time of the first touch and drag reaches a threshold value, the controller is configured to identifying the imaginary circle based on the circumference comprising the starting point, the middle point, and the final point on the path of the first touch and drag.

6. The electronic device of claim 4, wherein the maximum zoom-in magnification is set as a zoom-in magnification capable of zooming in the imaginary circle to a full screen.

7. An apparatus for controlling a screen display in a touch screen terminal, comprising:
   means for identifying an imaginary circle based on a circumference comprising a starting point, a middle point and a final point on a path of a first touch and drag in responsive to detecting the first touch and drag on the touch screen;

means for detecting a region inside the identified imaginary circle to be zoom, the region in which contents intended for zoom in are displayed;

means for panning the contents displayed in a detected region to a center of the screen display in response to detecting the detected region to be zoomed;

means for displaying a circle capable of designating up to maximum zoom-in magnification, wherein the maximum zoom-in magnification is set based on a size of the imaginary circle;

means for determining zoom-in magnification wherein the zoom-in magnification is proportional to a rotation angle associated with a final point of the second touch and drag in response to a second touch and drag following a circumference of the displayed circle;

means for zooming in the contents included in the detected region according to the determined zoom-in magnification via the circle.

8. The apparatus of claim 7, wherein the means for identifying the imaginary circle based on the circumference comprising the starting point, the middle point and the final point on the path of the first touch and drag comprises a means for:

identifying the imaginary circle based on the circumference comprising the starting point, the middle point, and the final point on the path of the first touch and drag when a distance or time of the first touch and drag reaches a threshold value.

9. The apparatus of claim 7, wherein the maximum zoom-in magnification is set as a zoom-in magnification capable of zooming in the imaginary circle to a full screen.

* * * * *